R. C. Dawson
R. Couch Jr.
V. A. Prange
    INVENTORS.

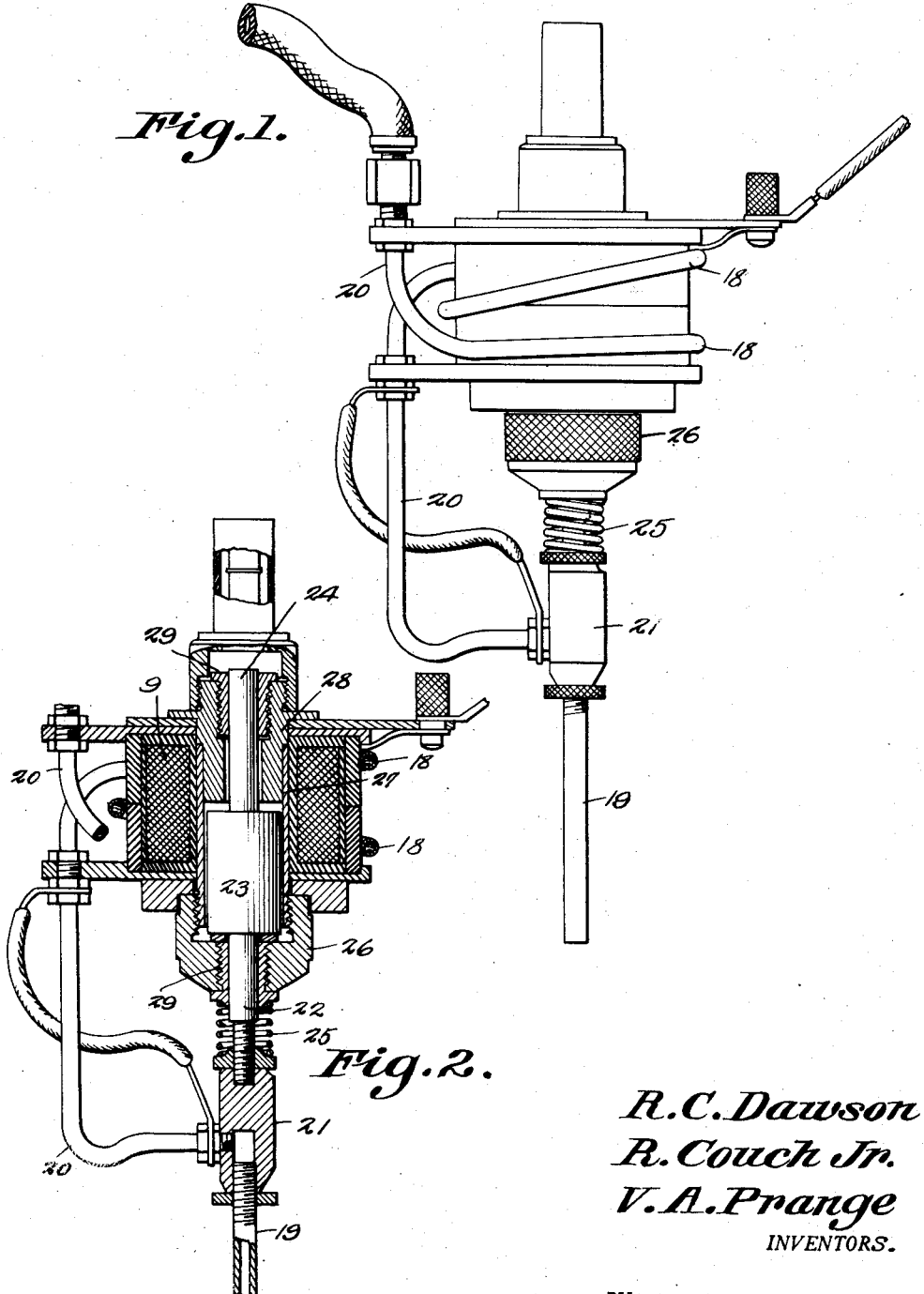

BY
    ATTORNEYS.

Patented Apr. 30, 1946

2,399,212

UNITED STATES PATENT OFFICE 2,399,212

DISINTEGRATOR DRILL

Reginald C. Dawson and Richard Couch, Jr., Detroit, and Vernon A. Prange, Berkeley, Mich., assignors to Syncro-Cut Service Company, Detroit, Mich., a corporation of Michigan Application June 20, 1944, Serial No. 541,246

5 Claims. (Cl. 219—15)

This invention relates to a tool for producing either round or irregular holes in hardened steel and in broken parts which are not easily accessible with ordinary tools. For example the invention can be used successfully in forming holes which have been omitted intentionally or otherwise from hardened finished work. It can be used in the removal of broken taps, drills and gauges from any material. It is useful in cutting wrench holes in broken screws and studs which cannot otherwise be removed. It is further useful in working on large cumbersome parts in inaccessible places, it being possible to operate the tool if inverted or in any other position found most convenient.

A further object of the invention is to provide a tool which forms the hole in the work by disintegration due to oxidation and crystallization through temperature differential between an electrode and a coolant.

A further object is to provide a tool of this character which will operate on half wave A. C. or pulsating D. C. whereby the disintegration of the work is effected only on the positive side of the sine wave thereby attaining positive action at the rate of exactly sixty oscillations per second and producing a quicker cut or disintegration than has been found possible in practice where oscillations at the rate of one hundred twenty times per second are effected in other tools which have been provided for the same purpose.

A still further object is to utilize a compensator winding for effecting perfect synchronization of oscillation and cutting power and developing a power build-up sufficient to overcome any tendency of the electrode or work-engaging tip to adhere to the work.

We are aware that it is not new in the metal working art to form holes in hard metal by oxidizing the metal through the rapid formation of arcs but the means thus far employed have operated on an alternating current at the rate of one hundred twenty oscillations per second. Due to the weight of the armature and other working parts in the tools, however, it has not been possible actually to vibrate the electrode at the rate stated and, as a result thereof and of the further fact that the current is permitted to flow in both directions through the electrode, the cutting operation is not as rapid as desired, the electrode frequently sticks to the work, and the parts become overheated because of the high current used and the stoppage of the water coolant resulting from the discontinuance of the operation of the tool.

An object of the present invention is to overcome all of the disadvantages present in the use of a disintegrating drill operating at a one hundred twenty rate of oscillation per second on an alternating current, the advantageous result being obtained primarily because of the fact that, in the present instance, the oscillations are effected solely at a low voltage on a single phase alternating current and on the positive half only of the cycle.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is an elevation of the tool.

Figure 2 is a longitudinal section therethrough.

Figure 3:
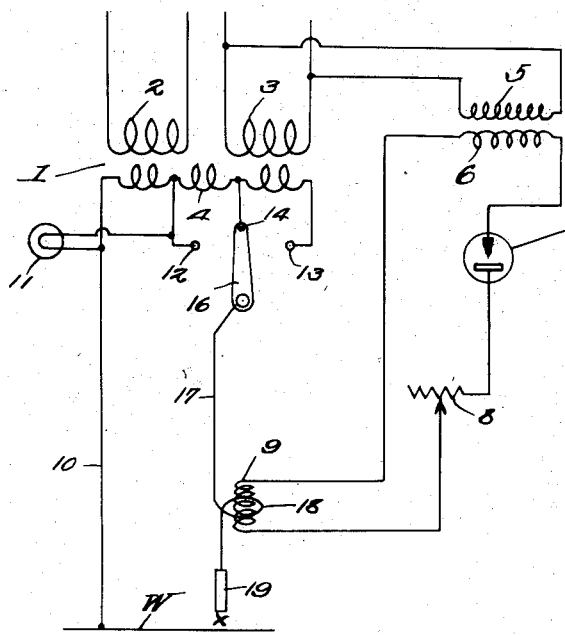
Figure 3 is a view showing, in diagram, the electrical circuit used in the operation of the tool.
Figure 4:
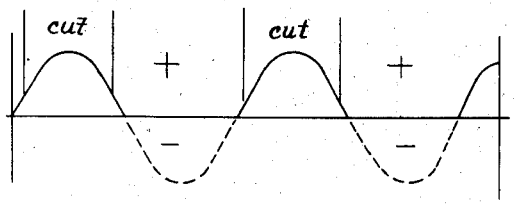
Figure 4 is a diagram illustrating that portion of the sine wave by which the tool is oscillated or reciprocated.

Referring to the figures by characters of reference, 1 designates a transformer including primary coils 2 and 3 and a secondary coil 4. The inputs to the primary coils can be suitably coupled to lines for supplying either 115 volts or 230 volts. The primary coil 3 is joined electrically to the primary 5 of a rectifier transformer the secondary 6 of which is in circuit with a half wave rectifier 7, a control rheostat 8, and the coil 9 of the tool.

One terminal of the secondary 4 is adapted to be grounded to the work, as indicated at 10, there being a low voltage pilot light 11 joined to this side of the secondary circuit and to an intermediate portion of the secondary and a contact 12. Another contact 13 is electrically connected to the other side of the secondary 4 while an intermediate contact 14 is connected to the secondary 4 as shown. A switch 16 is shiftable into engagement with any one of the contacts 12, 13 and 14 and is electrically connected, as at 17, to a compensator winding 18 in the tool which, in turn, is electrically connected to the electrode or drilling bit 19 of the tool.

In practice low voltage, high current is supplied by the transformer 1 and, as before stated, one terminal, 16, of this transformer is connected directly to the work W in which the cut is to be made. The taps provided in the secondary 4 are preferably arranged to produce working voltages of 4, 5, and 6 volts at a current of 120 amperes. The primary winding of this transformer, being connected to the supply lines, can be fed current at either 115 or 230 volts, this being optional and being permissible by varying the connections to the primary. By means of the selector switch 16 the desired voltage for effecting satisfactory operation on different types of drilling can be obtained. Current passing through this switch supplies the energy required to effect cutting at the end of the electrode 19.

The electrode is designed to reciprocate at the rate of sixty times per second on a standard sixty cycle current. This oscillation is produced by a solenoid type electromagnet 9 and is operated by half wave direct current supplied by copper oxide rectifier 7. By means of the rheostat 8, the current to the electromagnet 9 can be varied to correspondingly vary the stroke of the electrode 10. The compensation winding 18 adds to the torque of the cutting electrode 19 during the cutting operation and automatically controls the stroke and phase relations and causes the current in the electromagnet 9 to keep in step with the current from the secondary 4. This is a synchronous condition and is responsible for the advantageous results obtained by the use of this tool.

When the cutting electrode is brought against the work W the reciprocation causes the circuit to be made and broken sixty times per second. As the current supplied by the transformer 1 is in phase with the current in the solenoid 9, it will be obvious that only one half of each cycle is used to disintegrate and remove the metal and that each working stroke is operating on direct current of a pulsating nature.

As a result of the operation described, the speed of reciprocation in much less than that of other tools heretofore used and the electrode does not become overheated and will not stick to the work.

It is to be understood of course that the electrode 19 is tubular and is provided with the usual coolant supplied thereto through suitably located tubes 20 connected by a coiled tube which constitutes the compensator winding 18.

The construction of the tool per se will be apparent by referring to Figs. 1 and 2. Electrode 19 is held within a suitable socket member 21 to which the tube 20 is connected and this socket member, in turn, is connected to a stem 22 extending in one direction from the solenoid armature 23. Another stem 24 is extended in the opposite direction from this armature. A coiled spring 25 is interposed between the socket member 21 and a cap 26 which engages one end of a metal tube 27, both this cap and tube being formed preferably of aluminum and the upper end of the tube being engaged by a plug 28. Guide elements 29 are located in the cap 26 and plug 28 for the respective stems 22 and 24.

What is claimed is:

1. In a disintegrating drill a main transformer, a half wave rectifier, a rectifier transformer, and a solenoid coil connected in series to the half wave rectifier and the secondary of the rectifier transformer, the primary of said rectifier transformer being in parallel with the primary of the main transformer, an armature mounted for reciprocation in the coil, an electrode movable therewith, means including a compensating coil about the solenoid for connecting the electrode to the secondary of the main transformer, and means for grounding the said secondary of the main transformer to the work.

2. In a work disintegrating drill the combination with an electrode, of means for creating an arc between the electrode and the work during the positive portion only of each cycle of an alternating current, said means including a solenoid armature joined fixedly to the electrode, a circuit including in series a half wave rectifying means, the coil of the armature, and a source of low voltage alternating current, a compensating coil about the solenoid electrically connected at one end to the electrode, and an electrical connection between the other end of said compensating coil and a source of low voltage current and between said source and the work.

3. In a work disintegrating drill, the combination with a transformer, an electrode for intermittent contact with the work, and a grounding conductor for contact with the work, of an electromagnet, an armature therefor connected to and adapted to reciprocate the electrode, means leading from the primary of the transformer for energizing the electromagnet during the positive peaks only of the cycles of an alternating current supplied to the magnet, and means electrically connecting the grounding conductor to the electrode, said means including the secondary of the transformer and a compensating coil about the electromagnet and electrically connected at one end to the electrode.

4. In a work disintegrating device, a main transformer, a rheostat controlled, low voltage rectifier circuit including the secondary of a rectifier transformer, a half wave rectifier and an electromagnet, an armature controlled by said magnet, an electrode movable with the armature, and a low voltage circuit in step with the rectifier circuit and leading from the electrode to the secondary of the main transformer and to ground, said circuit including a compensator winding on the magnet.

5. A work disintegrating drill for operation by an alternating current, said drill including a yieldingly pressed work-engaging electrode, a power input for A. C. current, means interposed between the input and the electrode for shifting the electrode from the engaged work during the positive peaks only of the sine waves of the A. C. current, and a conducting means connected at one end to the electrode and grounded at the other end to the work, said means including a voltage-reducing transformer connected to the A. C. input, said electrode, when actuated by the magnet, constituting means for creating arcs between the electrode and the work on the positive side only of the sine waves to effect a pulsating direct current between the electrode and the work.

REGINALD C. DAWSON.
RICHARD COUCH, Jr.
VERNON A. PRANGE.